United States Patent
Kremser et al.

(10) Patent No.: US 8,156,965 B2
(45) Date of Patent: Apr. 17, 2012

(54) MODULAR ARRANGEMENT WITH MODULES, WHICH ARE ADDED IN A SERIES DIRECTION AND ARE FORMED AT LEAST PARTIALLY AS VALVE MODULES

(75) Inventors: Rolf Kremser, Göppingen (DE); Bernd Gienger, Weilheim (DE); Achim Ziegele, Uhingen-Baiereck (DE); Uwe Gräff, Ostfildern (DE)

(73) Assignee: Festo AG & Co. KG, Esslingen (DE)

( * ) Notice: Subject to any disclaimer, the term of this patent is extended or adjusted under 35 U.S.C. 154(b) by 873 days.

(21) Appl. No.: 12/228,474

(22) Filed: Aug. 13, 2008

(65) Prior Publication Data
US 2009/0045363 A1 Feb. 19, 2009

(30) Foreign Application Priority Data
Aug. 16, 2007 (EP) .................................. 07016035

(51) Int. Cl.
*F15B 13/00* (2006.01)
*G05B 19/418* (2006.01)
(52) U.S. Cl. ........................ 137/884; 137/560
(58) Field of Classification Search .................. 137/884, 137/271, 560
See application file for complete search history.

(56) References Cited

U.S. PATENT DOCUMENTS

| 6,173,731 B1 * | 1/2001 | Ottliczky | 137/271 |
| 7,690,398 B2 * | 4/2010 | Kuhbauch | 137/884 |
| 7,849,880 B2 * | 12/2010 | Herges | 137/884 |

FOREIGN PATENT DOCUMENTS

| DE | 10061686 | 6/2001 |
| EP | 1272767830 | 11/2003 |
| EP | 1464843 | 5/2005 |
| EP | 1183472 | 7/2007 |

* cited by examiner

Primary Examiner — Kevin Lee
(74) Attorney, Agent, or Firm — Hoffman & Baron, LLP

(57) ABSTRACT

A modular arrangement is proposed with modules (10-25) added in a row direction, these being constructed at least partially as valve modules (16-21, 23, 24), wherein one module is constructed as a control module (10) and is connected to the other modules (11-25) by control and/or sensor lines (30) running transversely through these modules. Voltage supply lines (36, 37) powered by a voltage source (33) run transversely through the modules (10-25). At least one module is constructed as a safety module (12) and has a switching arrangement (38) for interrupting the voltage supply lines (36) to the modules (13-21) powered via the safety module (12) in the activated state. Safety-related control and/or diagnostic electronics are provided for activating the switching arrangement (38).

20 Claims, 1 Drawing Sheet

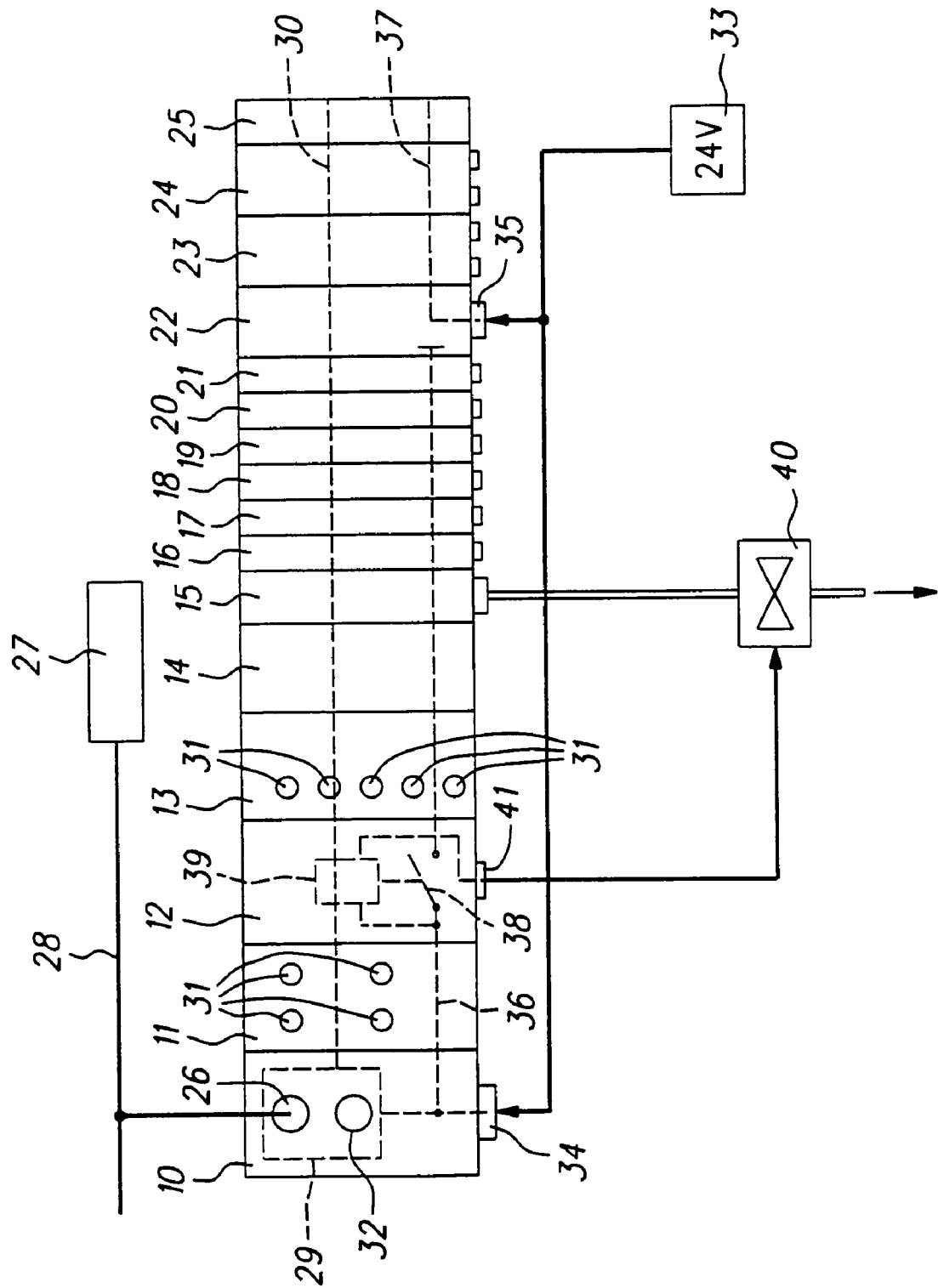

MODULAR ARRANGEMENT WITH MODULES, WHICH ARE ADDED IN A SERIES DIRECTION AND ARE FORMED AT LEAST PARTIALLY AS VALVE MODULES

BACKGROUND OF THE INVENTION

The invention relates to a modular arrangement with modules that are added in a row direction and that are formed at least partially as valve modules, wherein one module is formed as a control module and is connected to the other modules via control and/or sensor lines running transversely through this module, and with voltage-supply lines that run transversely through the module and are powered by a voltage source.

Such modular arrangements or valve batteries are known, for example, from EP 1272767 B1, EP 1464843 B1, or EP 1183472 B1 and are used for controlling a plurality of fluid actuators, wherein associated sensor signals can be fed back. Monitoring devices and diagnostic systems for such fluid arrangements are also known in different variations. The disconnection to be performed in the case of an error is performed by external components, whereby, in particular, if there are different disconnection areas, this leads to arrangements that are expensive and complicated to install and to maintain.

SUMMARY OF THE INVENTION

One task of the present invention consists in providing a modular arrangement of the class named above with a safety device so that, overall, a compact arrangement with low complexity is achieved.

This task is achieved according to the invention by a modular arrangement with the features of claim 1.

Advantageously, a safety module is integrated into the modular arrangement, so that in safety-critical cases the disconnection of modules takes place internally. This leads to a compact arrangement. In this way, areas not to be disconnected and areas to be disconnected can be defined easily. Through simple placement of the safety module in a series arrangement, it can be defined which modules should be disconnected in safety-related cases. If several safety modules are inserted into the modular arrangement, different areas can have different disconnection criteria.

Advantageous refinements and improvements of the modular arrangement specified in claim 1 are possible by means of the measures listed in the subordinate claims.

Advantageously, modules powered by the safety module and modules powered independently of the safety module are provided, wherein the independently powered modules are added between the safety module and a module connected to the voltage source and/or an isolation module permanently interrupting the internal voltage supply lines, wherein the isolation module is connected to the voltage source. This leads to a large variability with respect to the arrangement of the modules and the disconnection criteria.

Preferably, the control module is connected or can be connected to the voltage source or contains the voltage source, wherein it then has a corresponding voltage terminal for the voltage source. Because the control module should be constantly connected to the power voltage, this solution is favored.

For connecting to an external control device, the control module preferably has a bus terminal which is connected via a bus node and optionally via control electronics to the control and/or sensor lines running through the modules. Such internal control electronics are constructed for performing at least one part of the control functions, wherein an external control line connected to the bus terminal can perform control functions and/or programming functions when desired.

The safety-related control and/or diagnostic means can be arranged in the control module and/or in the safety module and/or in the external control device connected to the control module, wherein safety-related functions or diagnostic functions can also have a distributed arrangement.

In one advantageous improvement of the invention, at least one safety valve is provided that can be controlled by the safety module and is constructed as a venting and/or check valve for the valve modules according to whether venting is to take place in the valve modules or connected actuators or whether the existing pressure is to be maintained. These one or more safety valves can be constructed as external valves and/or as valve modules of the modular arrangement.

Advantageously, electrical modules of the modular arrangement are provided with control and/or sensor terminals, in order to be able to control actuators and to be able to report sensor responses back to the control module.

BRIEF DESCRIPTION OF THE DRAWING

One embodiment of the invention is shown in the drawing and is explained in more detail in the following description. The single FIGURE shows schematically a modular arrangement with a control module, a safety module, an isolation module, several electrical modules, and several valve modules.

DETAILED DESCRIPTION OF THE PREFERRED EMBODIMENTS

The modular arrangement shown as an embodiment in the single FIGURE is made from a plurality of modules added in a row direction. Such arrangements are also designated as valve batteries. These modules can be lined up, for example, on a rail or a base element, or can merely be connected to each other.

From left to right, the modular arrangement consists of the following modules: a control module 10, a first electrical module 11, a safety module 12, a second electrical module 13, a pneumatic connection module 14, a venting module 15, six valve modules 16-21, an isolation module 22, two double-valve modules 23, 24, and a terminating module 25.

The control module 10 has a bus terminal 26 for connecting to an external control device 27 or control center via an external bus 28. This bus terminal 26 is connected in the control module 10 to a bus node 29 from which internal control and/or sensor lines 30 run transversely through all of the attached modules 11-25. This can involve parallel and/or serial lines, wherein these are constructed as internal bus lines in the case of serial lines. The connected valve modules 16-21 or double valve modules 23, 24 are controlled by means of these control and/or sensor lines 30. Furthermore, not-shown external actuators connected to terminals 31 of the electrical modules 11, 13 are controlled accordingly, wherein sensor responses are also reported back to the control module 10 via these terminals 31. Furthermore, the safety module 12 is controlled in the manner described in more detail below.

The bus node 29 can also have control electronics in order to be able to perform the described control functions at least partially. Incidentally, the control can also be performed by the external control device 27 via the external bus 28. Accordingly, the sensor responses are fed back to the control electronics of the bus node 29 and/or the external control device 27.

The control module 10 also has a second bus terminal 32. Additional control modules of additional modular arrangements or of other control devices can be connected to this terminal in order to create a connection to the external bus 28.

For supplying voltage, an external voltage source 33 is connected to corresponding terminals 34, 35 of the control module 10 and the isolation module 22. For supplying voltage, corresponding voltage supply lines 36 connected to the terminal 34 run out from the control module 10 transversely through the modules 11-21, wherein the terminal 34 is also connected to the bus node 29 for its voltage supply.

The isolation module 22 breaks these internal voltage supply lines 36, wherein its terminal 35 is connected to internal voltage supply lines 37, which run transversely through the double valve modules 23, 24 in order ensure their independent voltage supply.

The safety module 12 has a switching arrangement 38 by means of which the voltage supply lines 36 to the modules 13-21 can be interrupted. Here, the safety module 12 has control electronics 39 for controlling the switching arrangement 28 [sic; 38], that is, for interrupting the voltage supply lines 36, when critical or safety-related states have been identified by a control and/or diagnostic device. This control and/or diagnostic device can be arranged in the control electronics 39 of the safety module 12 or in the control electronics of the control module 10 or in the external control device 27, wherein the corresponding control or diagnostic functions can also have a distributed arrangement. By interrupting the voltage supply lines 36 through the activation of the switching arrangement 38, the modules 13-21 are disconnected or transitioned into a safe state according to the module construction. Such a state in the non-energized state can be determined in different ways depending on the function.

The control module 10 and the first electrical module 11 are not affected by a safety disconnection. The same also applies for the double valve modules 23, 24, to which the supply voltage is applied separately via the isolation module 22. In the composition of the modular arrangement, it can be determined by the arrangement of the modules which modules should be disconnected in safety-related cases and which should still be supplied with voltage.

It is also possible for several different areas to be disconnected or to be transitioned into a safe state by means of different safety modules 12 according to different criteria.

The voltage source 33 can also be integrated, for example, in a module such as the control module 10, wherein a direct connection to the isolation module 22 must then be guaranteed. The voltage source 33 or an internal voltage source can also provide different voltages for different requirements of the modules. In general, this is a voltage of 24 V. The voltage source 33 obviously requires, in each case, a public mains connection or some other connection for voltage supply.

The isolation module 22 is an optional module. The double valve modules 23, 24 could also be arranged between the safety module 12 and the control module 10. However, depending on the number of modules in the modular arrangement, areas with separate voltage supplies can be useful.

The venting module 15 is used for venting the valve modules 16-21 or double valve modules 23, 24 and is connected to corresponding pneumatic connection lines or supply lines. This venting module 15 is connected to an external venting valve 40, which can be activated via a terminal 41 on the safety module 12 by the latter's control electronics 39. In the safety-related case, when the switching arrangement 38 interrupts the voltage supply lines 36, the venting valve 40 is also activated in order to vent the valve modules 16-21 or double valve modules 23, 24 via the venting module 15. In principle, this venting valve 40 can also be integrated into the venting module 15 and can then be controlled by means of the control and/or sensor lines 30 or by means of separate internal lines. Control is also possible independent of the switching arrangement 38.

The venting valve 40 can also be formed as a check valve or at least one additional check valve can be provided. In many fluid applications, it is better, namely in the safety case, to maintain the prevailing pressure and to perform no venting. This is the case, for example, in the use of suction grippers, which would release in a possibly undesired way if vented. If both venting of one part of the valve modules and maintaining the prevailing pressure in another part of the modules are desired in a safety-related case, then such valve modules can be assembled into groups and a venting valve or check valve can be assigned to each group. Into which groups the valve modules are to be assembled depends on the type of connected actuators, wherein individual assignments are also possible.

To simplify the diagram, the fluid feeds and other fluid details of the fluid area of the modular arrangement are not shown. For these details, refer to the state of the art specified above.

The invention claimed is:

1. A modular arrangement with modules, which are added in a row direction and which are formed at least partially as valve modules, wherein one module is a control module and is connected to the other modules by means of control or sensor lines running transversely through these modules, and with voltage supply lines, which run transversely through the modules and which are powered by a voltage source, and wherein at least one module is a safety module and has switching means for the voltage supply lines passing through said safety module, and wherein safety-related control or diagnostic means are provided for actuating the switching means and these are formed for interrupting the voltage supply lines to the modules powered via means of the safety module in the activated state.

2. A modular arrangement according to claim 1, wherein modules supplied with voltage via the safety module and modules supplied with voltage independently from this safety module are provided, and wherein the independently powered modules are lined up between the safety module and a module connected to the voltage source, or at an isolation module permanently interrupting the internal voltage supply lines, and wherein the isolation module is connected to the voltage source.

3. A modular arrangement according to claim 1, wherein the control module is connected or can be connected to the voltage source or contains the voltage source and has a voltage terminal for this voltage source.

4. A modular arrangement according to claim 1, wherein the control module has a bus terminal for connecting to an external control device and the control or sensor lines running through the modules are connected to the bus terminal via a bus node.

5. A modular arrangement according to claim 1, wherein the control module contains control electronics.

6. A modular arrangement according to claim 1, wherein the safety-related control or diagnostic means are arranged in the control module or in the safety module or in an external control device connected to the control module.

7. A modular arrangement according to claim 1, wherein at least one safety valve is provided, which can be controlled by the safety module and which is constructed as a venting or check valve for the valve modules.

8. A modular arrangement according to claim 7, wherein the at least one safety valve is constructed as an external valve or as a valve module of the modular arrangement.

9. A modular arrangement according to claim 1, wherein electrical modules of the modular arrangement are provided with control or sensor terminals.

10. A modular arrangement according to claim 1, wherein the voltage source is constructed as an external or internal voltage source.

11. A modular arrangement according to claim 2, wherein the control module is connected or can be connected to the voltage source or contains the voltage source and has a voltage terminal for this voltage source.

12. A modular arrangement according to claim 2, wherein the control module has a bus terminal for connecting to an external control device and the control or sensor lines running through the modules are connected to the bus terminal via a bus node.

13. A modular arrangement according to claim 2, wherein the control module contains control electronics.

14. A modular arrangement according to claim 2, wherein the safety-related control or diagnostic means are arranged in the control module or in the safety module or in an external control device connected to the control module.

15. A modular arrangement according to claim 2, wherein at least one safety valve is provided, which can be controlled by the safety module and which is constructed as a venting or check valve for the valve modules.

16. A modular arrangement according to claim 15, wherein the at least one safety valve is constructed as an external valve or as a valve module of the modular arrangement.

17. A modular arrangement according to claim 2, wherein electrical modules of the modular arrangement are provided with control and/or sensor terminals.

18. A modular arrangement according to claim 2, wherein the voltage source is constructed as an external or internal voltage source.

19. A modular arrangement according to claim 3, wherein the control module has a bus terminal for connecting to an external control device and the control or sensor lines running through the modules are connected to the bus terminal via a bus node.

20. A modular arrangement according to claim 3, wherein the control module contains control electronics.

* * * * *